United States Patent
Sethi et al.

(10) Patent No.: US 12,450,000 B2
(45) Date of Patent: *Oct. 21, 2025

(54) SYSTEM AND METHOD FOR DETERMINING THE SECURITY STATUS OF A SOURCE DEVICE BASED ON THE SECURITY REQUIREMENT OF THE DESTINATION DEVICE

(71) Applicant: Dell Products L.P., Round Rock, TX (US)

(72) Inventors: Parminder Singh Sethi, Ludhiana (IN); Atishay Jain, Meerut (IN)

(73) Assignee: DELL PRODUCTS L.P., Round Rock, TX (US)

( * ) Notice: Subject to any disclaimer, the term of this patent is extended or adjusted under 35 U.S.C. 154(b) by 206 days.

This patent is subject to a terminal disclaimer.

(21) Appl. No.: 18/173,256

(22) Filed: Feb. 23, 2023

(65) Prior Publication Data

US 2024/0289044 A1    Aug. 29, 2024

(51) Int. Cl.
  *G06F 3/06* (2006.01)
  *G06F 21/10* (2013.01)
  *G06F 21/62* (2013.01)

(52) U.S. Cl.
  CPC .......... *G06F 3/0647* (2013.01); *G06F 3/0604* (2013.01); *G06F 3/0683* (2013.01); *G06F 21/101* (2023.08); *G06F 21/6209* (2013.01)

(58) Field of Classification Search
  CPC .. G06F 21/101; G06F 21/6209; G06F 3/0647; G06F 3/0604; G06F 3/0683; G06F 3/067; G06F 21/6218
  See application file for complete search history.

(56) References Cited

U.S. PATENT DOCUMENTS

| | | | |
|---|---|---|---|
| 9,531,590 B2 | 12/2016 | Jain et al. | |
| 10,860,367 B2 | 12/2020 | Mani | |
| 2007/0079126 A1* | 4/2007 | Hsu | G06F 21/606 713/181 |
| 2010/0333116 A1* | 12/2010 | Prahlad | G06F 3/0605 713/153 |
| 2017/0171170 A1* | 6/2017 | Sun | H04L 9/088 |
| 2019/0286475 A1* | 9/2019 | Mani | G06F 9/45558 |
| 2020/0226144 A1 | 7/2020 | Chen | |
| 2021/0192366 A1 | 6/2021 | Kadambi | |

(Continued)

*Primary Examiner* — Linglan Edwards
*Assistant Examiner* — Saron Matthewos Worku
(74) *Attorney, Agent, or Firm* — Chamberlain, Hrdlicka, White, Williams & Aughtry; Aly Z. Dossa

(57) ABSTRACT

A method for managing data migration includes: receiving, by a target storage device, a migration request for migration of application data from a source storage device to the target storage device, in response to the migration request: sending a security remote security script to the source storage device, obtaining a response based on execution of the security remote security script on the source storage device, performing a security classification on the source storage device based on the response to obtain a security tag for the source storage device, determining a migration strategy for the migration of the application data from the source storage device based on the security tag, and implementing the migration strategy to migrate the application data from the source storage device to the target storage device.

20 Claims, 7 Drawing Sheets

(56) References Cited

U.S. PATENT DOCUMENTS

| | | |
|---|---|---|
| 2021/0374013 A1 | 12/2021 | Prasad |
| 2021/0397495 A1 | 12/2021 | Prakash |
| 2022/0129181 A1 | 4/2022 | Morabad |
| 2023/0281219 A1 | 9/2023 | Lee |
| 2023/0289325 A1 | 9/2023 | Kurian |

* cited by examiner

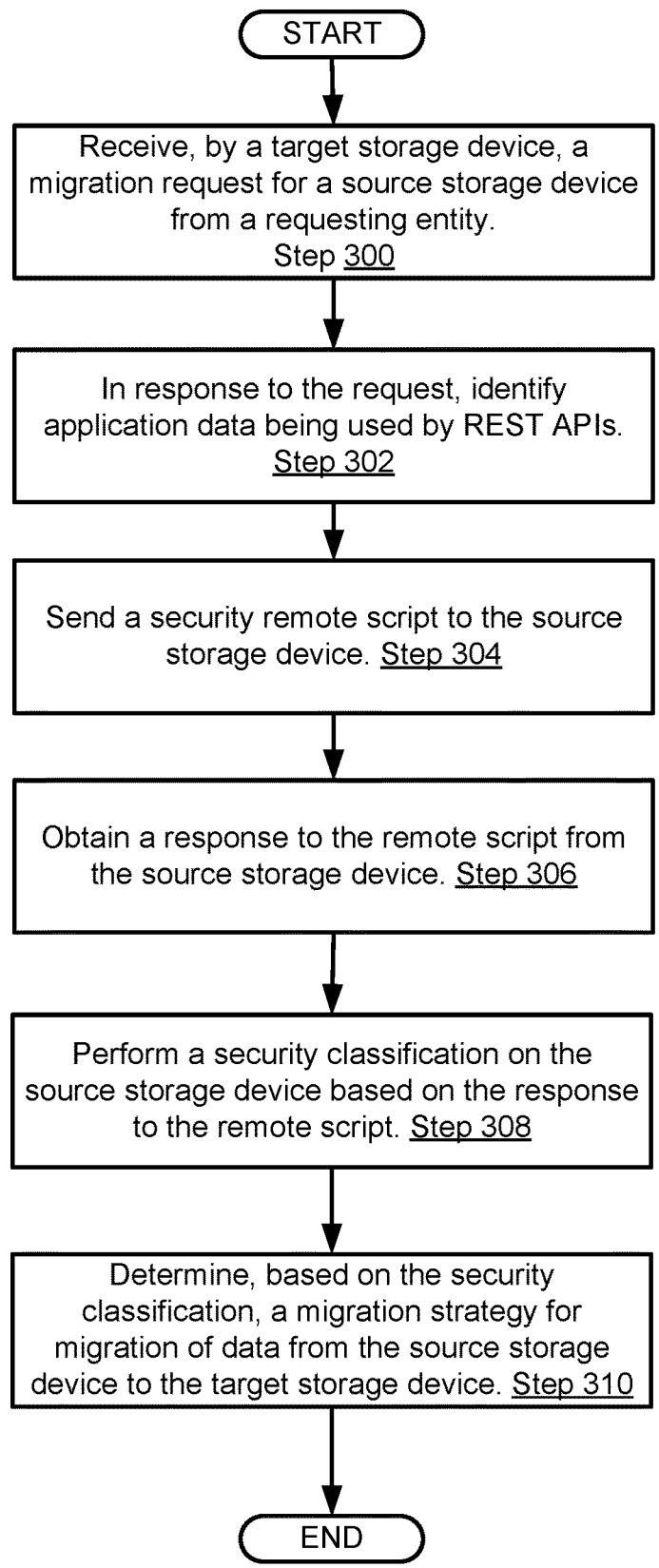
FIG. 3.1

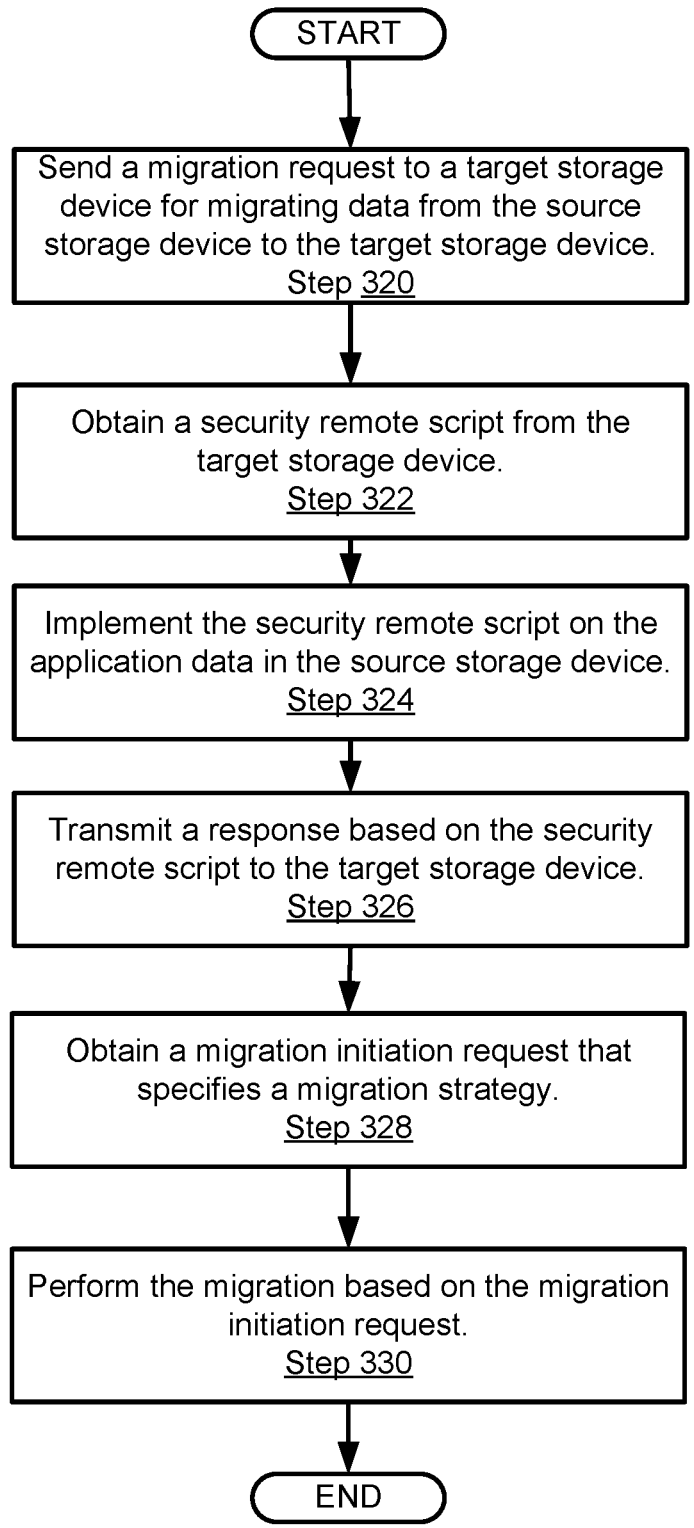
FIG. 3.2

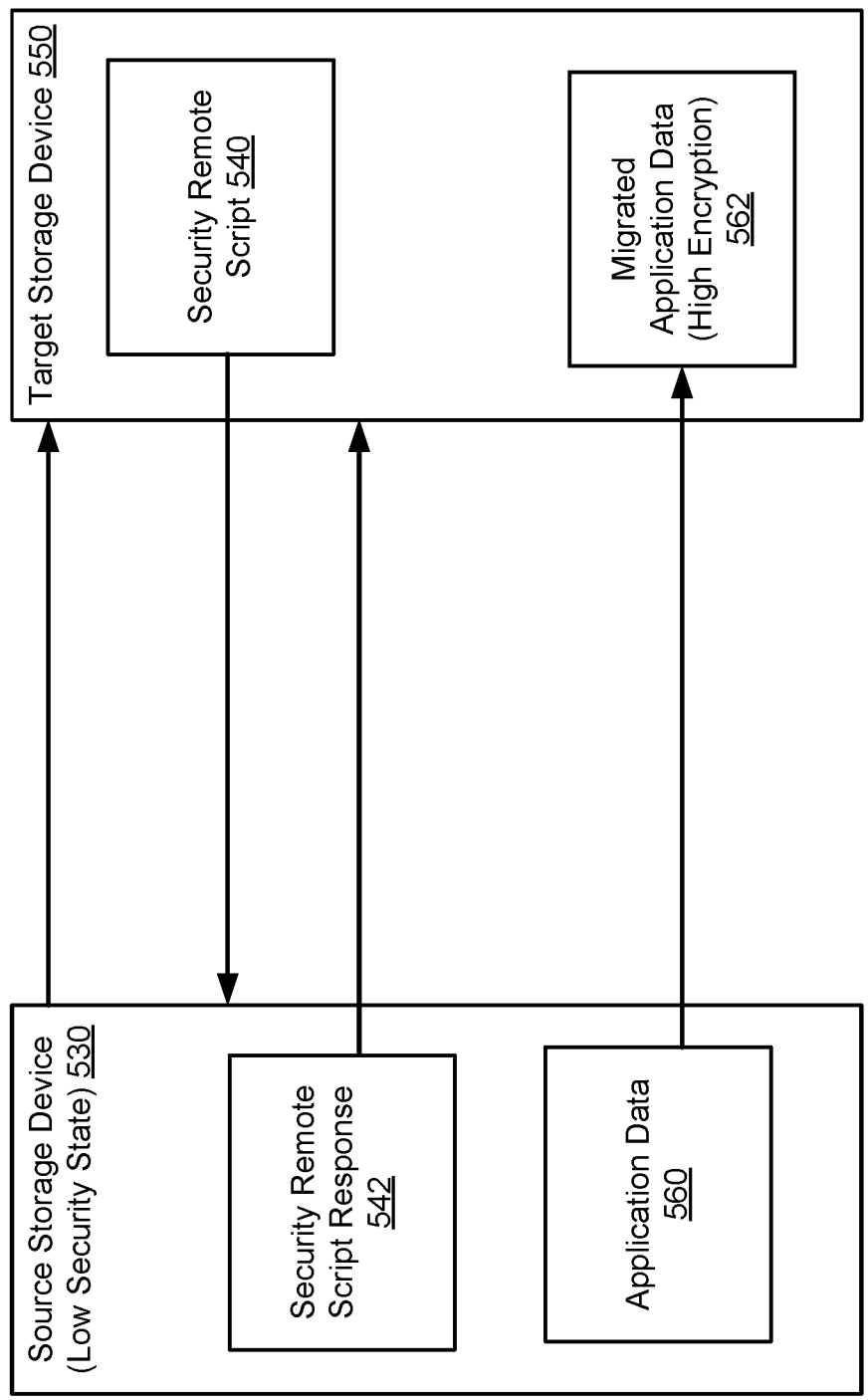
FIG. 4.1

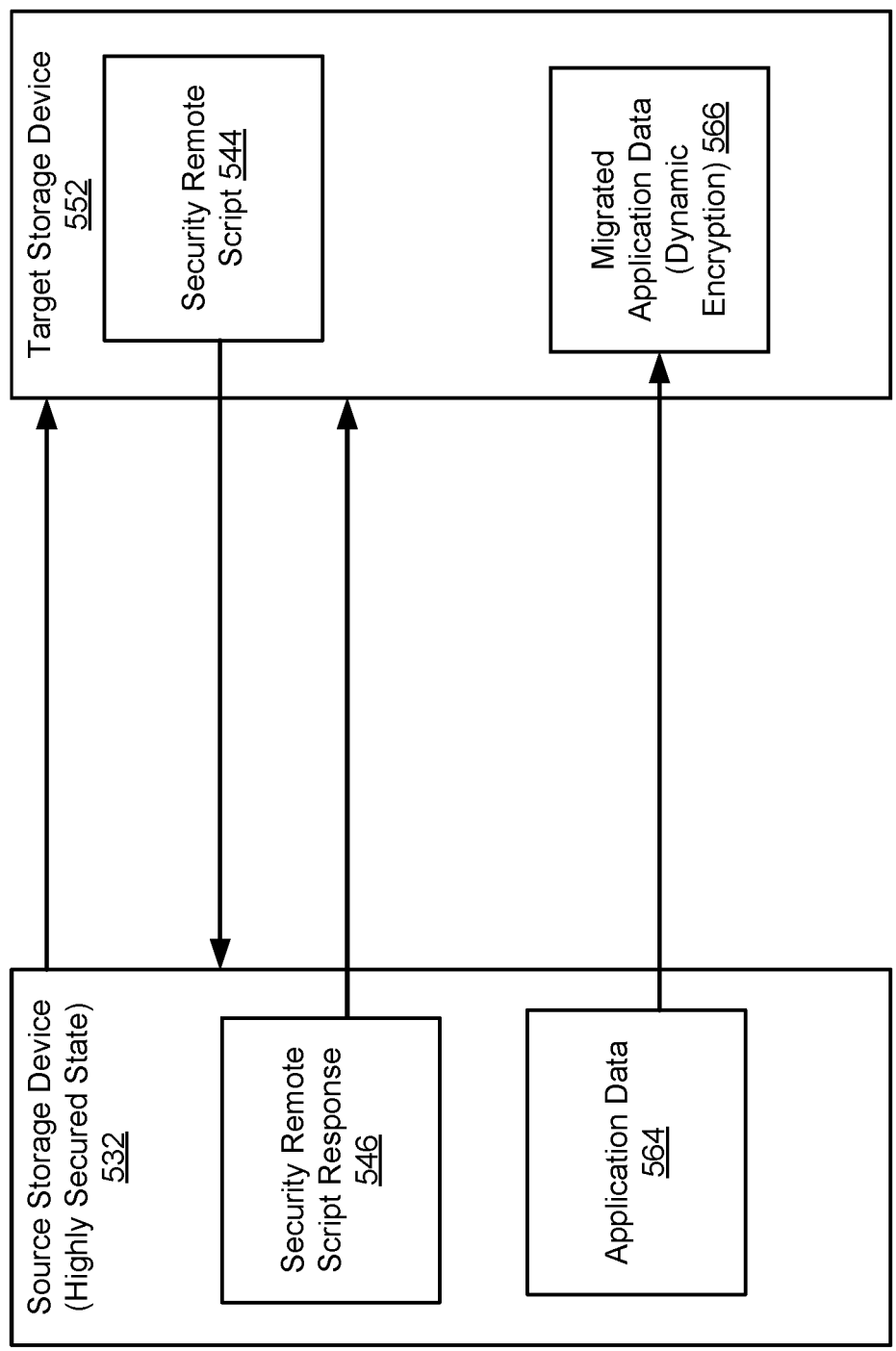
FIG. 4.2

SYSTEM AND METHOD FOR DETERMINING THE SECURITY STATUS OF A SOURCE DEVICE BASED ON THE SECURITY REQUIREMENT OF THE DESTINATION DEVICE

BACKGROUND

Computing devices in a system may include any number of hardware resources such as processors, memory, and persistent storage. The computing devices may utilize the hardware resources to host applications and/or other logical devices. The logical devices may be migrated from one computing device to another.

BRIEF DESCRIPTION OF DRAWINGS

Certain embodiments of the invention will be described with reference to the accompanying drawings. However, the accompanying drawings illustrate only certain aspects or implementations of the invention by way of example, and are not meant to limit the scope of the claims.

FIG. 3.1 shows a method for determining and implementing a data migration by a target storage device in accordance with one or more embodiments of the invention.

FIG. 3.2 shows a method for initiating a data migration by a source storage device in accordance with one or more embodiments of the invention.

FIGS. 4.1 and 4.2 show example use cases in accordance with one or more embodiments of the invention.

DETAILED DESCRIPTION

Figure 1:
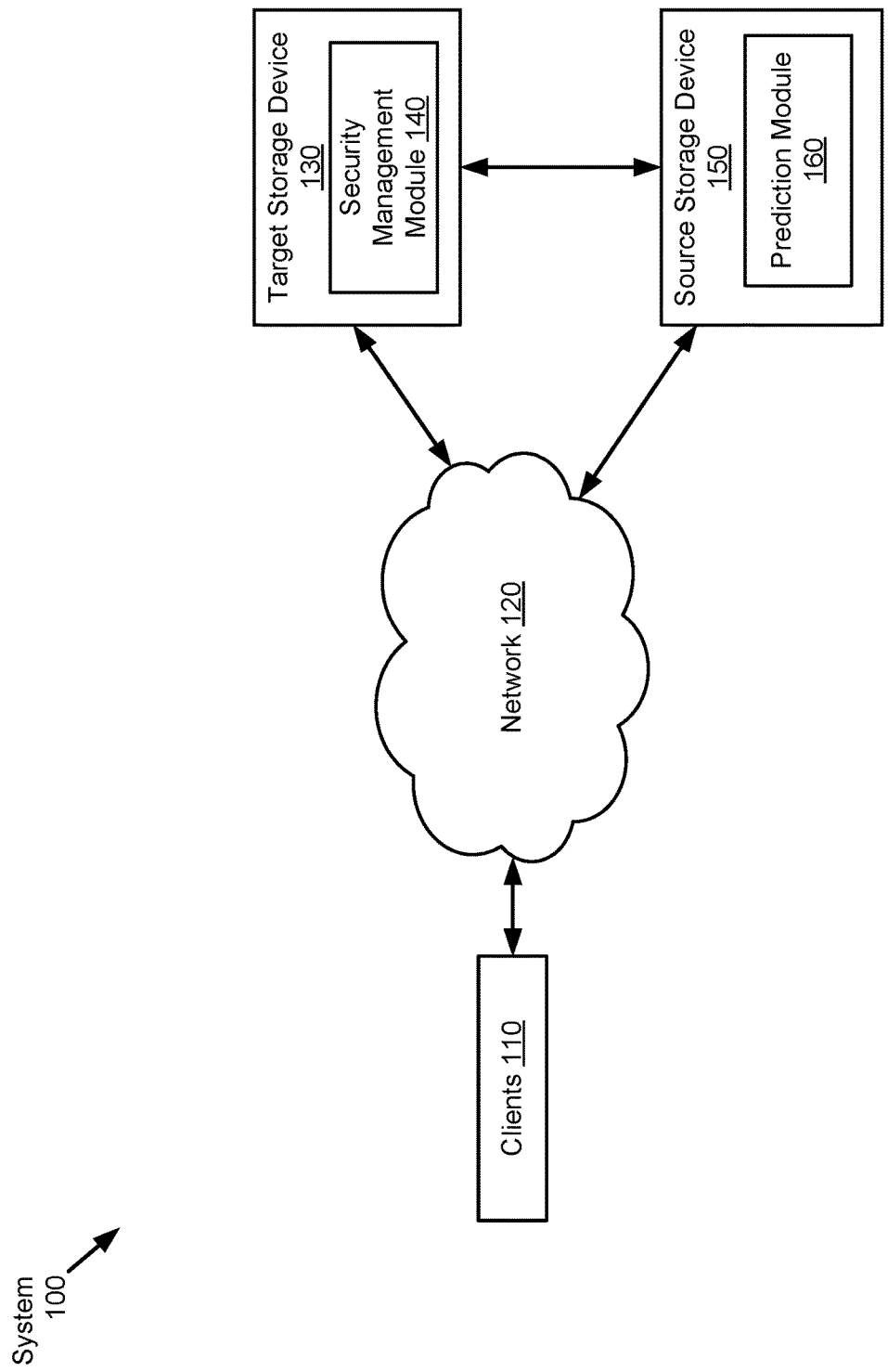
FIG. 1 shows a diagram of a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of one or more embodiments of the invention. However, it will be apparent to one of ordinary skill in the art that the one or more embodiments of the invention may be practiced without these specific details. In other instances, well-known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, embodiments of the invention relate to a method and system for managing storage devices. Specifically, embodiments relate to methods and systems for managing a migration of data, generated by the storage devices or by external devices, from a first storage device to a second storage device by identifying security requirements of the storage devices.

In a client environment, for a server device (also referred to as a "server") that is deployed, many other devices can connect to the server and transfer data to the server. The server processes the data based on the requirement from the connected devices. To meet a set of security requirements and to ensure the safety of the data being processed in the server, the connected devices are sometimes required to deploy certain security protocols before connecting to the server to ensure that the device is secured. In one or more embodiments, there may be a desire by an administrator of the client environment to migrate data in a storage device, used by the server, to a second storage device. One issue to be addressed in such an approach is ensuring the authenticity and security status of the old device. The old storage device might be a bad actor or might contain malware. This may impact the security of any other data in the new storage device. For example, the migration of data from a non-secured storage device to a new storage device may compromise the security of the new storage device. In current implementation, there is no method or intelligence to ensure the security of the source storage device connecting to the newer device (also referred to as the "target storage device").

Embodiments disclosed herein include utilizing a security module operating on the target storage device. This new component will include a remote security script, which will be sent as part of the first handshake between the new device and the old device before migration of data between the two starts. The remote security script may be implemented to track and identify security protocols/requirements necessary to ensure the authenticity and security of the old device. Upon completion of processing, the remote security script will identify the security state and send back the data to the new device for further processing. Based upon the security state received from the old device through remote security script, the new device will have tag the old device. Examples of security tags applied to the source storage device include: least, very low, low, average, above average, high, very high.

Embodiments disclosed herein include installing the security module on the new storage device, and when the source storage device requests a data migration to the new storage device (e.g., the target storage device), the proposed component will execute the remote security script to ensure security standards of the old storage device. If the security status of the old device is known before starting migration, the new device can comply and impose necessary security requirements. The benefit of this may be to ensure that any storage device to which we are establishing connection before migration is security complied.

In one or more embodiments, once a connection is established and prior to starting the migration, the old storage device sends a data migration request to the new storage device. The target storage device sends a remote security script (e.g., using stateful representational state transfer application programming interfaces (stateful REST APIs)) to be executed on the source storage device. The remote security script may analyze the security requirements of the source storage device and return a security status to the new storage device. The target storage device may, in turn, use the security status to determine next steps for the migration based on the obtained security status.

In one or more embodiments, the new component uses this security status, as well as previous data analyzed by machine learning algorithms such as, for example, gradient boost and decision trees algorithms, to determine the level of compression and/or needed in order to save maximum amount of data before the device dies.

Based on the determined level of compression, for the dying device we can prioritize the level of data being migrated from the old device. If the old device is unsecure, then the data from it will also be unsecure and the security has to be strong by keeping encryption strict. If the old device is secure, we can lower the encryption and migrate as much data as possible.

For example, the security installed in the old storage device may calculate a level of encryption for the migration of data. In this example, if the old storage device is determined to have a high level of security, a dynamic level of encryption is implemented. The dynamic level of encryption may include low encryption and high compression. This may maximize the amount of data migrated to the new device without worrying about the security. In the example, if the old storage device is determined to have a low level of security, a high level of encryption is implemented. A tradeoff for performing the high level of encryption may include an increase in the rate of degradation of the old device. In this manner, the amount of data that is migrated is not considered, and instead the quality of data migrated to the new device is considered by enforcing a high level of encryption.

The following describes various embodiments of the invention.

FIG. 1 shows a diagram of a system (100) in accordance with one or more embodiments of the invention. The system (100) includes any number of clients (110), a network (120), a source storage device (150), and a target storage device (130). The system (100) may include additional, fewer, and/or different components without departing from the scope of the invention. Each component may be operably connected to any of the other components via any combination of wired and/or wireless connections. Each component illustrated in FIG. 1 is discussed below.

In one or more embodiments, the source storage device (150), the clients (110), and the target storage device (130) may be physical or logical devices, as discussed below. In one or more embodiments, the system (100) may include any number of storage devices without departing from the scope of the invention. In one or more embodiments, the source storage devices may collectively be referred to as "a source environment". Similarly, in one or more embodiments, the target storage devices may collectively be referred to as "a target environment".

While FIG. 1 shows a specific configuration of the system (100), other configurations may be used without departing from the scope of the invention. For example, although the clients (110) and the storage devices (the source storage device (150), the target storage device (130)) are shown to be operatively connected through the network (120), the clients (110) and the storage devices (130, 150) may be directly connected, without an intervening network (e.g., 120). As yet another example, although the source storage device (150) and the target storage device (130) are shown to be directly connected, the source storage device (150) and the target storage device (130) may be executing on the same environment (e.g., a production host environment).

Further, the functioning of the clients (110) and the storage devices (130, 150) is not dependent upon the functioning and/or existence of the other device(s) in the system (100). Rather, the clients (110) and the storage devices (130, 150) may function independently, and perform operations locally that do not require communication with other devices. Accordingly, embodiments disclosed herein should not be limited to the configuration of devices and/or components shown in FIG. 1.

In one or more embodiments, the system (100) may deliver computing power and storage capacity as a service to users of the clients (110) via the network (120). The system (100) may also represent a comprehensive middleware layer running on computing devices (e.g., 500, FIG. 5) that supports virtualized application environments. In one or more embodiments, the system (100) may support a virtual machine (VM) environment, and may map capacity requirements (e.g., computational load, storage access, etc.) of VMs and supported applications to available resources (e.g., processing resources, storage resources, etc.) managed by the environments (e.g., 130, 150). Further, the system (100) may be configured for workload placement collaboration and computing resource (e.g., processing, storage/memory, virtualization, networking, etc.) exchange.

As used herein, "computing" refers to any operations that may be performed by a computer, including (but not limited to): computation, data storage, data retrieval, communications, etc.

As used herein, a "computing device" refers to any device in which a computing operation may be carried out. A computing device may be, for example (but not limited to):

a compute component, a storage component, a network device, a telecommunications component, etc.

In one or more embodiments, as being a physical computing device or a logical computing device (e.g., a VM), the source storage device (150) may be configured for hosting and maintaining various workloads, or for providing a computing environment (e.g., computing power and storage) whereon workloads may be implemented. The source storage device (150) may also exchange data with other nodes (e.g., other source storage devices, target storage devices, etc.) registered in/to the network (120) in order to, for example, participate in a collaborative workload placement. For example, the source storage device (150) may split up a request (e.g., an operation, a task, an activity, etc.) with another source storage device, coordinating its efforts to complete the request (e.g., to generate a response) more efficiently than if the source storage device (150) had been responsible for completing the request.

One of ordinary skill will appreciate that the source storage device (150) may perform other functionalities without departing from the scope of the invention. Examples of the source storage device (150) may include (but not limited to): an enterprise server, a modular server, a blade server, a mainframe, a workstation computer, etc. In one or more embodiments, the source storage device (150) may be a heterogeneous set, including different types of hardware components and/or different types of operating systems (OSs).

In one or more embodiments, a workload (not shown) may refer to a physical or logical component configured to perform certain work functions. Workloads may be instantiated (e.g., initiated, executed, etc.) and may be operated while consuming computing resources allocated thereto. Examples of a workload may include (but not limited to): a VM, a container, a database, an application, a collection of microservices, etc.

As used herein, a "server" may provide computer-implemented services (e.g., receiving a request, sending a response to the request, etc.) to the users. In one or more embodiments, the request may be, for example (but not limited to): a web browser search request, a REST request, a computing request, a database management request, etc. To provide the computer-implemented services to the users, the server may perform computations locally and/or remotely. By doing so, the server may utilize different computing devices (e.g., 500, FIG. 5) that have different quantities of computing resources (e.g., processing cycles, memory, storage, etc.) to provide a consistent user experience to the users.

As used herein, a "database" is an organized collection of structured data, typically stored in a computing system. In most cases, a database is controlled by a database management system, in which the data and the database management system (along with the applications that are associated with them) are referred to as a "database system". Data within the database system (simply "database") is typically modeled in rows and columns in a series of tables to make processing and querying efficient. Most databases use structured query language (SQL) for writing and querying data.

As used herein, a "container" is an executable unit of software in which an application code is packaged, along with its libraries and dependencies, so that it can be executed anywhere. To do this, a container takes advantage of a form of OS virtualization in which features of the OS are leveraged to both isolate processes and control the amount of central processing unit (CPU), memory, and disk that those processes have access to.

Comparing to a VM, a container does not need to include a guest OS in every instance and may simply leverage the features and resources of a host OS. For example, instead of virtualizing the underlying hardware components, a container virtualize the OS, so the container includes only the application (and its libraries and dependencies). The absence of the guest OS makes a container lightweight, fast, and portable.

In one or more embodiments, as being a stateful environment with stateful REST APIs (where the APIs of the same application(s) are interdependent), the source storage device (150) may utilize any number of applications (and/or content accessible through the applications) that provide stateful, computer-implemented application services to a user. Applications may be designed and configured to perform one or more operations (e.g., functions, tasks, activities, etc.) instantiated by a user of the source storage device (150). Examples of an application may include (but not limited to): a word processor, a media player, a web browser, a file viewer, an image editor, etc.

In one or more embodiments, application services may include, for example (but not limited to): database services, electronic communication services, instant messaging services, file storage services, web-based services, desktop-based services, a workload placement collaboration, serving (e.g., processing) a request, sharing an application log, receiving computing resource details of a node, transmitting a request, analyzing data, streaming video, etc.

In order to provide the above-mentioned application services, each application may host similar or different components. The components may be, for example (but not limited to): instances of databases, instances of email servers, etc. Applications may be executed on one or more clients as instances of the applications.

In one or more embodiments, applications may vary in different embodiments, but in certain embodiments, applications may be custom developed or commercial (e.g., off-the-shelf) applications that a user desires to execute in the source storage device (150). In one or more embodiments, applications may be logical entities executed using computing resources of the source storage device (150). For example, applications may be implemented as computer instructions, e.g., computer code, stored in persistent storage that when executed by a processor(s) of a computing device (e.g., 500, FIG. 5) cause the computing device to provide the functionality of the applications described throughout this application.

In one or more embodiments, while performing, for example, one or more operations requested by a user, applications installed on a server using the source storage device (150) may include functionality to request and use physical and logical components (discussed below) of the server. The applications may perform other types of functionalities not listed above without departing from the scope of the invention. In one or more embodiments, while providing application services to a user, applications may store data that may be relevant to the user in storage/memory resources (discussed below) of the source storage device (150).

In one or more embodiments, in order to provide the above-mentioned application services to a user, applications may need to communicate with one another with a minimum amount of latency. For this reason, in most cases, RESTful APIs (also referred to herein as "REST APIs") are used for communications between applications. As used herein, a "REST API" is an interface that two computing devices use to exchange data securely over the Internet. More specifically, the term "REST" defines a set of rules and constraints (e.g., not a protocol or a standard) that need to be followed when building the services. Any application that adheres to those rules and constraints will be able to communicate via a set of uniform, shared, and stateless (or stateful) operators and requests. APIs denote the underlying code that, if it conforms to the set of rules and constraints, allows the applications to communicate with one another.

As used herein, an "API" represents a collection of methods and procedures (e.g., retrieving information about an API source, updating the API source, etc.) that define how applications or computing devices can connect to and communicate with each other. The collection of methods and procedures may be designed and configured to facilitate an application's connection (e.g., access) to one another. In general, the application performing the accessing is called "the client", and the application containing a resource is called "the server".

In operation, REST APIs use Hypertext Transfer Protocol (HTTP) to communicate. More specifically, REST APIs communicate via HTTP to perform standard database functions such as creating, reading, updating, and deleting records within a resource. For example, a well-designed REST API is similar to a webpage executing on a web browser with built-in HTTP functionality.

As used herein, "HTTP" is a request/response protocol that is used in cases in which a synchronous request/response is required. This means that applications (e.g., services) making requests via REST APIs must be designed to expect an immediate response. If the client receiving the response is down, the sending service may be blocked while it awaits for the response. To prevent this, failover and error handling logic may be applied to (e.g., built into) both applications.

In one or more embodiments, there may be four HTTP requests (e.g., methods): (i) "get" requests, (ii) "post" requests, (iii) "put" requests, and (iv) "delete" requests. In one or more embodiments, users may use "get" requests to access resources that are located at a specified uniform resource locator (URL) on a server. They may cache "get" requests and send parameters in a REST API request to instruct the server to filter data before sending. Users may use "post" requests to send data to the server, in which sending the same "post" request multiple times may have a side effect of creating the same resource multiple times. Further, users may use "put" requests to update existing resources on the server. Unlike "post", sending the same "put" request multiple times in a RESTful web service may give the same result. Users may also use "delete" requests to remove the resource. A "delete" request may change the server state; however, if a user does not have appropriate authentication, the "delete" request may fail.

In one or more embodiments, in order to facilitate the communication between applications, two types of REST APIs (e.g., stateless REST APIs and stateful REST APIs) may be used. As used herein, a "state" of a REST API (or an application, for example) specifies its condition or quality of being at a given point in time. In most cases, whether a REST API is stateful or stateless depends on how long the state of interaction with it is being recorded and how that information needs to be stored.

In a REST API architecture, "statelessness" refers to a communication method in which the server completes every user request independently of all previous requests. In this architecture, users may request resources in any order, and every request is stateless or isolated from other requests (e.g., there is no stored knowledge of or reference to past transactions and each request is separate and unconnected). This REST API design constraint implies that servers may completely understand and fulfill each request every time (e.g., each request needs to include all the information necessary to initiate processing). Said another way, stateless REST APIs do not require any server-side sessions and applications are not allowed to store any data related to the requests.

In most cases, stateless applications may provide one service (or function) and use content delivery network, web, or print servers to process these "short-term" requests. An example of a stateless transaction may be an online search operation performed by a user. The user may type a question into a search engine and then hit enter. If this operation is interrupted or ended accidentally, the user may need to start a new operation. This indicates that (i) these two API calls are not dependent on each other and (ii) the result of the first API call not need to be considered to make the second API call.

Further, in the REST API architecture, "statefulness" refers to a communication method in which a current request may be affected by the context of previous requests (e.g., by what happened during previous transactions). This REST API design constraint implies that stateful applications (and processes) may be executed based on the context of previous transactions. For this reason, stateful applications may use the same servers each time they process a request(s) from a user (e.g., a second API call may take a state from a result of a first API call). In this manner, when a stateful transaction is interrupted, the user may continue (more or less) from the point where the user left off because the context and history (e.g., a window location, a setting preference, a recent activity, etc.) have already been stored.

In one or more embodiments, in order to provide computer-implemented services, the source storage device (150) may include a collection of physical components (e.g., processing resources, storage/memory resources, networking resources, etc.) configured to perform operations of the source storage device (150) and/or otherwise execute a collection of logical components (e.g., applications, virtualization resources, etc.) of the source storage device (150).

In one or more embodiments, a processing resource (not shown) may refer to a measurable quantity of a processing-relevant resource type, which can be requested, allocated, and consumed. A processing-relevant resource type may encompass a physical device (i.e., hardware), a logical intelligence (i.e., software), or a combination thereof, which may provide processing or computing functionality and/or services. Examples of a processing-relevant resource type may include (but not limited to): a CPU, a graphical processing unit (GPU), a data processing unit (DPU), etc.

As used herein, a "CPU" may refer to an electronic circuitry that may execute operations specified by an application. A CPU may perform an operation based on the following three steps: (i) fetching instructions related to an operation from the storage/memory resources, (ii) analyzing the fetched instructions, and (iii) performing the operation based on the analysis. In one or more embodiments, an operation may be, for example (but not limited to): comparing numbers, performing a function, displaying a video, etc.

As used herein, a "GPU" may refer to an electronic circuitry that may provide parallel data processing capabilities to generate enhanced, real-time graphics and to perform accelerated computing tasks (which is particularly useful for machine learning (ML) operations). In one or more embodiments, a GPU may include, for example (but not limited to):

a graphics memory controller, a video processing engine, a graphics and computation engine, etc.

As used herein, a "DPU" may refer to an electronic circuitry that may perform accelerated data processing and optimized data movement data within each node. In one or more embodiments, the DPU may include, for example (but not limited to): a high-speed (e.g., 200 gigabits per second (200 Gbps)) networking interface, dynamic RAM (DRAM), a multi-core (e.g., 8-core) CPU, programmable acceleration engines (particularly for ML, security, and telecommunications purposes), etc.

In one or more embodiments, a storage or memory resource (not shown) may refer to a measurable quantity of a storage/memory-relevant resource type, which can be requested, allocated, and consumed. A storage/memory-relevant resource type may encompass a physical device, a logical intelligence, or a combination thereof, which may provide temporary or permanent data storage functionality and/or services. Examples of a storage/memory-relevant resource type may be (but not limited to): a hard disk drive (HDD), a solid-state drive (SSD), random access memory (RAM), Flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), persistent memory (PMEM), virtualized storage, virtualized memory, etc.

As used herein, "storage" may refer to a hardware component that is used to store data (e.g., application data) in each node. Storage may be a physical computer readable medium. In most cases, storage may be configured as a storage array (e.g., a network attached storage array), in which a storage array may refer to a collection of one or more physical storage devices. Each physical storage device may include non-transitory computer readable storage media, in which the data may be stored in whole or in part, and temporarily or permanently.

As used herein, "memory" may be any hardware component that is used to store data in each node. The data stored may be accessed almost instantly (e.g., in milliseconds (ms)) regardless of where the data is stored in memory. The memory may provide the above-mentioned instant data access because the memory may be directly connected to a CPU on a wide and fast bus (e.g., a high-speed internal connection that transfers data among hardware components of the node).

In one or more embodiments, application data may include, for example (but not limited to): a list of instructions, one or more application logs, etc. In one or more embodiments, application logs may include, for example (but not limited to): a setting of an application, a warning/an error (e.g., unknown software exception (0xc00d) occurred in the application at location 0x0007d) occurred in an application, a version of an application, a version of an OS, a display resolution configuration of a client, a type of an OS (e.g., a workstation OS), an identifier of an OS (e.g., Microsoft® Windows), a product identifier of an application, etc.

In one or more embodiments, a "setting of an application" may refer to a current setting that is being applied to an application either by a user or by default. A setting of an application may include, for example (but not limited to): a display option (e.g., a two-sided view) that is selected by a user, a font option that is selected by a user, an inbox folder setting of an electronic mail exchange application, a microphone setting of an application, a background setting of an application, etc.

In one or more embodiments, the source storage device (150) may include a memory management unit (MMU) (not shown), in which the MMU is configured to translate virtual addresses (e.g., those of a virtual address space (discussed below)) into physical addresses (e.g., those of memory). In one or more embodiments, the MMU may be operatively connected to the storage/memory resources, and the MMU may be the sole path to access the memory, as all data destined for the memory must first traverse the MMU prior to accessing the memory. Further, the MMU may be configured to (i) provide memory protection (e.g., allowing only certain applications to access memory) and (ii) provide cache control and bus arbitration.

In one or more embodiments, while applications provide computer-implemented services to the clients (110), the applications may store data that may be relevant to the clients (110) to the storage/memory resources. When the client-relevant data is stored, the client-relevant data may be subjected to loss, inaccessibility, or other undesirable characteristics based on the operation of the storage/memory resources.

To mitigate, limit, and/or prevent such undesirable characteristics, users of the clients (110) may enter into agreements (e.g., service level agreements) with providers (e.g., vendors) of the storage/memory resources. These agreements may limit the potential exposure of client-relevant data to undesirable characteristics. These agreements may, for example, require duplication of client-relevant data to other locations so that if the storage/memory resources fail, another copy (or other data structure usable to recover the data on the storage/memory resources) of the client-relevant data may be obtained. These agreements may specify other types of activities to be performed with respect to the storage/memory resources without departing from the invention.

In one or more embodiments, each application may include a virtual address space. A virtual address space may be a simulated range of addresses (e.g., identifiable locations) that mimics physical locations of one or more physical components of the source storage device (150). In most cases, an application is not configured to identify the physical locations of the components; rather, the application relies on other components of the source storage device (150) to translate one or more virtual addresses of the virtual address space to one or more physical addresses of the physical components. Accordingly, in one or more embodiments, an application may utilize a virtual address space to read, write, and/or otherwise manipulate data, without being configured to directly identify the physical address of that data within the physical components of the source storage device (150).

Further, each application may communicate with other components of the source storage device (150) to establish a mapping between a virtual address space and the physical components of the source storage device (150). In one or more embodiments, when a mapping is established, an application's use of the virtual address space enables the application to directly manipulate data in the physical components, without relying on other components of the source storage device (150) to repeatedly update mappings between the virtual address space and the physical addresses of the physical components of the source storage device (150).

In one or more embodiments, a networking resource (not shown) may refer to a measurable quantity of a networking-relevant resource type, which can be requested, allocated, and consumed. A networking-relevant resource type may encompass a physical device, a logical intelligence, or a combination thereof, which may provide network connectivity functionality and/or services. Examples of a networking-relevant resource type may include (but not limited to): a network interface card, a network adapter, a network processor, etc.

In one or more embodiments, a networking resource may provide capabilities to interface the source storage device (150) with external entities (e.g., the target storage device (130), the clients (110), etc.) and to allow for the transmission and receipt of data with those entities. A networking resource may communicate via any suitable form of wired interface (e.g., Ethernet, fiber optic, serial communication etc.) and/or wireless interface, and may utilize one or more protocols (e.g., transmission control protocol (TCP), user datagram protocol (UDP), Remote Direct Memory Access, IEEE 801.11, etc.) for the transmission and receipt of data.

In one or more embodiments, a networking resource may implement and/or support the above-mentioned protocols to enable the communication between the source storage device (150) and the external entities. For example, a networking resource may enable the source storage device (150) to be operatively connected, via Ethernet, using a TCP protocol to form a "network fabric", and may enable the communication of data between the source storage device (150) and the external entities. In one or more embodiments, the source storage device (150) may be given a unique identifier (e.g., an Internet Protocol (IP) address) to be used when utilizing the above-mentioned protocols.

Further, a networking resource, when using a certain protocol or a variant thereof, may support streamlined access to storage/memory media of other nodes. For example, when utilizing remote direct memory access (RDMA) to access data on another node, it may not be necessary to interact with the logical components of that node. Rather, when using RDMA, it may be possible for the networking resource to interact with the physical components of that node to retrieve and/or transmit data, thereby avoiding any higher-level processing by the logical components executing on that node.

In one or more embodiments, a virtualization resource (not shown) may refer to a measurable quantity of a virtualization-relevant resource type (e.g., a virtual hardware component), which can be requested, allocated, and consumed, as a replacement for a physical hardware component. A virtualization-relevant resource type may encompass a physical device, a logical intelligence, or a combination thereof, which may provide computing abstraction functionality and/or services. Examples of a virtualization-relevant resource type may include (but not limited to): a virtual server, a VM, a container, a virtual CPU, a virtual storage pool, etc.

As an example, a VM may be executed using computing resources of the source storage device (150). The VM (and applications hosted by the VM) may generate data (e.g., VM data) that is stored in the storage/memory resources of the source storage device (150), in which the VM data may reflect a state of the VM. In one or more embodiments, the VM may provide services to clients (110), and may host instances of databases, email servers, or other applications that are accessible to the clients (110).

In one or more embodiments, a virtualization resource may include a hypervisor, in which the hypervisor may be configured to orchestrate an operation of a VM by allocating computing resources of the source storage device (150) to the VM. In one or more embodiments, the hypervisor may be a physical device including circuitry. The physical device may be, for example (but not limited to): a field-programmable gate array (FPGA), an application-specific integrated circuit, a programmable processor, a microcontroller, a digital signal processor, etc. The physical device may be adapted to provide the functionality of the hypervisor.

Alternatively, in one or more of embodiments, the hypervisor may be implemented as computer instructions, e.g., computer code, stored on storage/memory resources of the source storage device (150) that when executed by processing resources of the source storage device (150) cause the source storage device (150) to provide the functionality of the hypervisor.

In one or more embodiments, the source storage device (150) further includes a prediction module (160). The prediction module (160) may include functionality for predicting a potential failure of the source storage device (150). The prediction module (160) may initiate a remediation in response to the prediction to prevent the potential failure. The remediation may include initiating a migration of data from the source storage device (150) to the target storage device (130). The remediation may be initiated performed, for example, in accordance with FIG. 3.2.

In one or more embodiment, the target storage device (130) may further include a security management module (140), which may be coupled (e.g., interacting) with at least one stateful application service executing on the target storage device (130). In one or more embodiments, the security management module (140) may be separate from and connected to both storage devices (130, 150). The security management module (140) may be implemented using hardware, software, or any combination thereof. The security management module (140) may be configured to perform all, or a portion, of the functionality described in FIG. 3.1. Additional details about the security management module are described below in reference to FIG. 2.

Figure 5:
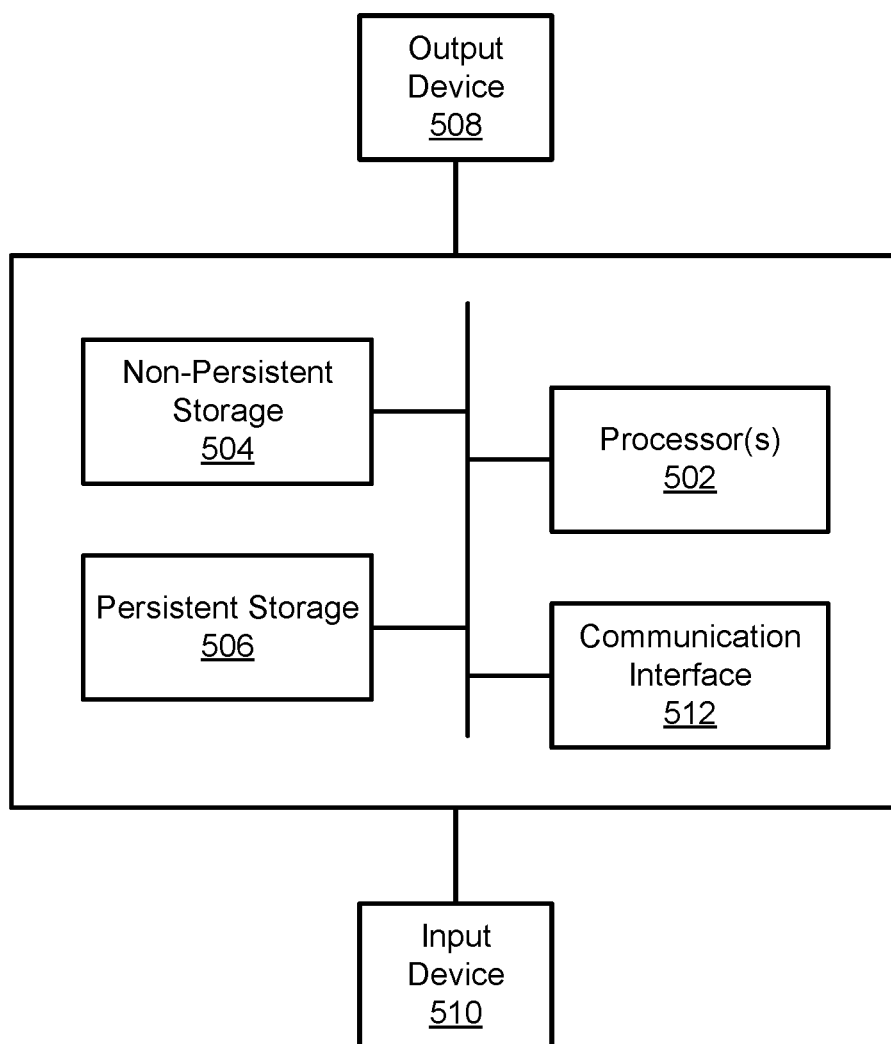
FIG. 5 shows a diagram of a computing device in accordance with one or more embodiments of the invention.

In one or more embodiments, the source storage device (150) may be implemented as a computing device (e.g., 500, FIG. 5). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the source storage device (150) described throughout this application.

Alternatively, in one or more embodiments, the source storage device (150) may be implemented as a logical device. The logical device may utilize the computing resources of any number of computing devices to provide the functionality of the source storage device (150) described throughout this application.

In one or more embodiments, the target storage device (130) may be implemented as a computing device (e.g., 500, FIG. 5). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the target storage device (130) described throughout this application.

Alternatively, in one or more embodiments, similar to the source storage device (150), the target storage device (130) may also be implemented as a logical device.

In one or more embodiments, the clients (110) may provide computer-implemented services to users of the clients (110) (and/or other computing devices such as, other clients or other types of devices). The clients (110) may provide any number and any type of computer-implemented services (e.g., data storage services, electronic communication services, etc.). The clients (110) may be physical or logical devices, as discussed below.

To provide computer-implemented services, entities hosted by the clients (110) may utilize data from any number of resources. For example, the clients (110) may utilize data stored in storage/memory resources of the source storage device (150). The clients (110) may also utilize data from other resources without departing from the invention.

In one or more embodiments, the clients (110) may issue requests to a node or server utilizing the source storage device (150). The requests issued by the clients may be to (i) receive responses and (ii) interact with various components of the source storage device (150) (described above). The clients (110) may also request data from and/or send data to the source storage device (150). Further, the clients (110) may initiate an application to execute on the source storage device (150) such that the application may (itself) gather, transmit, and/or otherwise manipulate data located on the source storage device (150), remote to the clients (110). In one or more embodiments, the clients (110) may share access to more than one node and may similarly share any data located on those nodes.

In one or more embodiments, the clients (110) may be implemented as computing devices (e.g., 500, FIG. 5). A computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the clients (110) described throughout this application.

Alternatively, in one or more embodiments, similar to the source storage device (150), the clients (110) may also be implemented as logical devices.

In one or more embodiments, users may interact with (or operate) the clients (110) in order to perform work-related tasks (e.g., production workloads). In one or more embodiments, the accessibility of users to the clients (110) may depend on a regulation set by the administrators. To this end, each user may have a personalized user account that may, for example, grant access to certain data, applications, and computing resources of the clients (110). This may be realized by implementing a "virtualization" technology. Virtualization allows for the generation of a VM that behaves as if it were a physical computing device with its own hardware components. When properly implemented, VMs on the same host (e.g., the client) are sandboxed from one another so that they do not interact with each other, and the data, applications, and computing resources from one VM are not visible to another VM even though they are on the same physical host.

In one or more embodiments, for example, a user may be automatically directed to a login screen of a client when the user connects to that client. Once the login screen of the client is displayed, the user may enter credentials (e.g., username, password, etc.) of the user on the login screen. The login screen may be a graphical user interface (GUI) generated by a visualization module (not shown) of the client. In one or more embodiments, the visualization module may be implemented in hardware (e.g., circuitry), software, or any combination thereof.

In one or more embodiments, the GUI may be displayed on a display of a computing device (e.g., 500, FIG. 5) using functionalities of a display engine (not shown), in which the display engine is operatively connected to the computing device. The display engine may be implemented using hardware, software, or any combination thereof. The login screen may be displayed in any visual format that would allow the user to easily comprehend (e.g., read and parse) the listed information.

In one or more embodiments, the network (120) may represent a computing network configured for computing resource and/or messages exchange among registered computing hosts (i.e., the storage devices (130, 150), the clients (110), etc.). As discussed above, components of the system (100) may operatively connect to one another through the network (120) (e.g., a local area network (LAN), a wide area network (WAN), a mobile network, a wireless LAN (WLAN), etc.). In one or more embodiments, the network (120) may be implemented using any combination of wired and/or wireless connections. Further, the network (120) may enable interactions between the storage devices (130, 150) and the clients (110) through any combination of wired and/or wireless network protocols (e.g., TCP, UDP, Internet Protocol version 4 (IPv4), etc.).

The network (120) may encompass various interconnected, network-enabled subcomponents (not shown) (e.g., switches, routers, gateways, cables etc.) that may facilitate communications between the components of the system (100).

In one or more embodiments, the network-enabled subcomponents may be capable of: (i) performing one or more communication schemes (e.g., IP communications, Ethernet communications, etc.), (ii) being configured by one or more nodes (e.g., 130, 150, etc.) in the network (120), and (iii) limiting communication(s) on a granular level (e.g., on a per-port level, on a per-sending device level, etc.).

In one or more embodiments, before communicating data over the network (120), the data may first be broken into smaller batches (e.g., data packets) so that larger size data can be communicated efficiently. For this reason, the network-enabled subcomponents may break data into data packets. The network-enabled subcomponents may then route each data packet in the network (120) to distribute the network traffic uniformly.

In one or more embodiments, the network-enabled subcomponents may decide how real-time (e.g., on the order of ms or less) network traffic and non-real-time network traffic should be managed in the network (120). In one or more embodiments, the real-time network traffic may be high priority (e.g., urgent, immediate, etc.) network traffic. For this reason, data packets of the real-time network traffic may need to be prioritized in the network (120). The real-time network traffic may include data packets related to, for example (but not limited to): videoconferencing, web browsing, voice over Internet Protocol (VoIP), etc.

In one or more embodiments, the non-real-time network traffic may be low priority (e.g., non-urgent) network traffic.

For this reason, data packets of the non-real-time network traffic may not need to be prioritized in the network (120). The non-real-time network traffic may include data packets related to, for example (but not limited to): File Transfer Protocol (FTP) for web publishing, email applications, etc.

Figure 2:
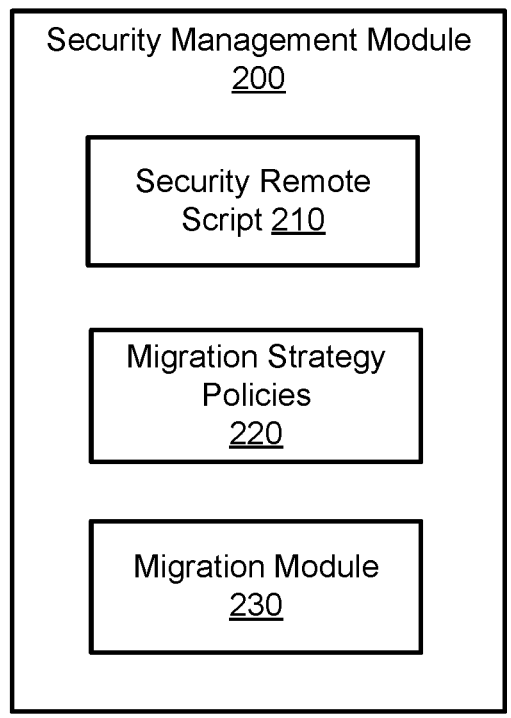
FIG. 2 shows a diagram of a security module in accordance with one or more embodiments of the invention.

Turning now to FIG. 2, FIG. 2 shows a diagram of a security management module (200) in accordance with one or more embodiments of the invention. The security management module (200) may be an example of the security management module discussed above in reference to FIG. 1. The security management module (200) may include a security remote script (210), a migration strategy policies (220), a migration module (230), and a replication module (240). The security management module (200) may include additional, fewer, and/or different components without departing from the scope of the invention. Each component may be operably connected to any of the other component via any combination of wired and/or wireless connections. Each component illustrated in FIG. 2 is discussed below.

In one or more embodiments, the security remote script (210) may be an executable function that may be transmitted to the source storage device (150, FIG. 1) discussed above. In one or more embodiments, a security remote script (210) may be communicated over the network (e.g., 120, FIG. 1). The security remote script (210) may include a set of instructions to be executed by the source storage device that specify obtaining information for gathering information from the source storage device. The set of instructions may include, for example, parsing the application data in a file system stored in the source storage device, determining a number of files that are corrupted, analyzing the hardware resources in the source storage device to determine a security status of the source storage device. Other instructions may be executed for the security remote script (210) without departing from the invention.

One of ordinary skill will appreciate that the security remote script (210) may perform other functionalities without departing from the scope of the invention. The security remote script (210) may be implemented using hardware, software, or any combination thereof. Additional details of the security remote script are described below in reference to FIGS. 3.1-3.2.

In one or more embodiments, the migration strategy policies (220) are data structures that specify a migration strategy to be performed based on a security status of the source storage device. The migration strategy policies may associate each security tag (e.g., low, very high, high, etc.) to a migration strategy. For example, in the migration strategy policies, a low security status may be associated with a migration strategy that includes a high encryption. In contrast, a high security status may be associated with a migration strategy that includes a dynamic encryption.

As used herein, a "high encryption" refers to a method or process of implementing an encryption algorithm on a large portion of data that is migrated. Further, a "dynamic encryption" refers to a method or process of implementing an encryption algorithm to a portion of data that is smaller than that of the high encryption. The dynamic encryption may further refer to a changing level of encryption during the migration.

In one or more embodiments, the migration module (230) may include functionality to perform, or at least initiate, a migration of data from the source storage device to the target storage device. The migration module may perform (or initiate) the migration in accordance with, for example, FIGS. 3.1-3.2.

While FIG. 2 shows a specific configuration of the security management module (200), other configurations may be used without departing from the scope of the disclosure. Accordingly, embodiments disclosed herein should not be limited to the configuration of devices and/or components shown in FIG. 2.

FIG. 3.1 shows a method for determining and implementing a data migration by a target storage device in accordance with one or more embodiments of the invention. While various steps in the method are presented and described sequentially, those skilled in the art will appreciate that some or all of the steps may be executed in different orders, may be combined or omitted, and some or all steps may be executed in parallel without departing from the scope of the invention.

Turning now to FIG. 3.1, the method shown in FIG. 3.1 may be executed by, for example, the above-discussed security module (e.g., 200, FIG. 2). Other components of the system (100) illustrated in FIG. 1 or 2 may also execute all or part of the method shown in FIG. 3.1 without departing from the scope of the invention.

In Step 300, a migration request is received from a requesting entity. In one or more embodiments, the migration request specifies the migration of application data from the requesting entity to the target storage device executing the security module. The requesting entity may be, for example, the source storage device. The migration request may be sent by the source storage device in accordance with, for example, FIG. 3.2.

In Step 302, in response to the migration request, application data is identified. In one or more embodiments, the application data to be migrated is determined based on the migration request. For example, the migration request may specify a data set that includes the identified application data to be migrated. Further, in one or more embodiments, the In Step 304, a security remote script is sent to the source storage device. In one or more embodiments of the invention, the security remote script is sent via a REST API. As discussed in FIG. 2, security remote script may include the implementation of a set of instructions to be executed by the source storage device. The execution of the security remote script may be performed in accordance with FIG. 3.2.

In Step 306, a response to the remote script is obtained from the source storage device. In one or more embodiments, the response is based on the results of the execution of the security remote script. The response may include, for example, security information collected by executing the security remote script.

In Step 308, a security classification is performed on the source storage device based on the response to the remote script. In one or more embodiments, the security classification is a process for assigning a security tag to the source storage device based on the response (e.g., the security information) obtained in Step 306. For example, based on the number of corrupted files specified in the security information, the security classification may include assigning a security tag that specifies a high security status if the number of files is significantly low (e.g., zero to five files). In contrast, if the number of corrupted files is high, the security status may be assigned as very low.

In Step 310, a migration strategy is determined based on the security classification. In one or more embodiments, the migration strategy is determined based on the migration strategy policies (220, FIG. 2) discussed above. Examples of migration strategies include, but are not limited to: a high encryption migration strategy, high compression migration strategy, and a dynamic encryption migration strategy.

In one or more embodiments, the method may end following Step 310.

FIG. 3.2 shows a method for initiating a data migration by a source storage device in accordance with one or more embodiments of the invention. While various steps in the method are presented and described sequentially, those skilled in the art will appreciate that some or all of the steps may be executed in different orders, may be combined or omitted, and some or all steps may be executed in parallel without departing from the scope of the invention.

Turning now to FIG. 3.2, the method shown in FIG. 3.2 may be executed by, for example, the above-discussed source storage device (e.g., 150, FIG. 1). Other components of the system (100) illustrated in FIG. 1 or 2 may also execute all or part of the method shown in FIG. 3.2 without departing from the scope of the invention.

In Step 320, a migration request is sent to a target storage device for migrating data from the source storage device to the target storage device. In one or more embodiments, the migration request is sent based on a determination that the source storage device is approaching an imminent failure. The determination may be made based on a prediction model (see, e.g., 160, FIG. 1) that calculates a predicted period of time before a failure is expected.

In Step 322, a security remote script is obtained. In one or more embodiments of the invention, the security remote script obtained in Step 322 is the same security remote script sent by the target storage device in Step 304.

In Step 324, the security remote script is implemented on the application data in the source storage device. In one or more embodiments, the security remote script is implemented by executing the set of instructions of the security remote script on the application data. The results of implementing the security remote script is security information that is obtained from the analysis of the application data.

In Step 326, a response is transmitted to the target storage device. The response may include the security information obtained in Step 324. Further, the response may include performing the security classification (e.g., in accordance with Step 308 of FIG. 3.1) at the source storage device and generating a security tag. The security tag may be included in the response. In such embodiments in which the security tag is generated by the source storage device, Step 308 may not be performed by the target storage device.

In Step 328, a migration initiation request is obtained from the target storage device. The migration initiation request may specify the migration strategy as determined in Step 310 of FIG. 3.1.

In Step 330, the migration is performed based on the migration strategy. The migration may include transmitting the data from the source storage device to the target storage device in accordance with the migration strategy (e.g., the level of encryption) specified in the migration initiation request.

Start of Example 1

The following section describes an example of one or more embodiments. The example, illustrated in FIG. 4.1, is not intended to limit the scope of the embodiments disclosed herein and is independent from any other examples discussed in this application.

Turning now to FIG. 4.1, FIG. 4.1 shows a scenario in which a source storage device where a failure is imminent. Specifically, the source storage device (530) determines that the source storage device (530) has approximately 30 minutes before the failure occurs, and the application data (560) in the source storage device (530) is lost. To remediate the potential loss of the application data (560), the source storage device (530) sends a migration request to a target storage device (550) for migrating the application data (560) to the target storage device (550).

In response to the migration request, a security remote script (540) is sent to the source storage device (530). The security remote script (540) is executed on the source storage device (530) to parse the files in the application data (560) and identify a number of corrupted files in the application data (560). Based on the execution of the security remote script (540) on the source storage device (530), a large number of files are deemed corrupted. The identified number of corrupted files is specified in a security remote script response (542). The security remote script response (542) is transmitted to the target storage device (550).

Based on the specified large number of corrupted files in the security remote script response (542), the target storage device (550) performs a security classification to assign a "low" security tag to the source storage device (530). The assignment of a "low" security tag results in a migration strategy being initiated that comprises a high encryption. The result is migrated application data (562) stored in the target storage device (550).

The high encryption may result in an increase in the rate of degradation of the source storage device (530). The increase of the rate of degradation decreases the amount of data that can be transmitted during the migration, as the available amount of time to perform the migration is decreased. However, the decision to perform a migration strategy that includes a high encryption is based on the attempt to protect the security of the target storage device despite the potential cost of the amount of data that gets protected. In this manner, the migrated application data (562) includes only a portion of the application data (560) that was encrypted during the migration.

End of Example 1

Start of Example 2

The following section describes a second example of one or more embodiments. The example, illustrated in FIG. 4.2, is not intended to limit the scope of the embodiments disclosed herein and is independent from any other examples discussed in this application. The second example may be similar to Example 1 illustrated in FIG. 4.1, with a few differences. Non-exhaustive differences between Example 1 and Example 2 include the number of corrupted files in the application data of the source storage devices and, in response, the type of migration strategy performed during the migration.

Turning now to FIG. 4.2, FIG. 4.2 shows a scenario in which a source storage device where a failure is imminent. Specifically, the source storage device (532) determines that the source storage device (532) has approximately 30 minutes before the failure occurs, and the application data (564) in the source storage device (532) is lost. To remediate the potential loss of the application data (562), the source storage device (532) sends a migration request to a target storage device (552) for migrating the application data (564) to the target storage device (552).

In response to the migration request, a security remote script (542) is sent to the source storage device (532). The security remote script (542) is executed on the source storage device (532) to parse the files in the application data (564) and identify a number of corrupted files in the application data (564). Based on the execution of the security remote script (542) on the source storage device (532), zero files are deemed corrupted. The identified number of corrupted files (i.e., zero) is specified in a security remote script response (546). The security remote script response (546) is transmitted to the target storage device (552). The result is migrated application data (566) stored in the target storage device (550).

Based on the specified number of corrupted files (i.e., zero) in the security remote script response (546), the target storage device (552) performs a security classification to assign a "high" security tag to the source storage device (532). The assignment of a "high" security tag results in a migration strategy being initiated that comprises a dynamic encryption. The dynamic encryption may result in a low rate of degradation of the source storage device (532). The low rate of degradation may preserve the most amount of data that can be transmitted during the migration. However, the decision to perform a migration strategy that includes a dynamic encryption is based on the attempt to migrate as much of the application data (564) without prioritizing the encryption of the data. In this manner, at least the majority of the application data (564) is included in the migrated application data (566).

End of Example 2

Turning now to FIG. 5, FIG. 5 shows a diagram of a computing device in accordance with one or more embodiments of the invention.

In one or more embodiments of the invention, the computing device (500) may include one or more computer processors (512), non-persistent storage (504) (e.g., volatile memory, such as RAM, cache memory), persistent storage (506) (e.g., a hard disk, an optical drive such as a CD drive or a DVD drive, a Flash memory, etc.), a communication interface (512) (e.g., Bluetooth interface, infrared interface, network interface, optical interface, etc.), an input device(s) (510), an output device(s) (508), and numerous other elements (not shown) and functionalities. Each of these components is described below.

In one or more embodiments, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (e.g., a LAN, a WAN, Internet, mobile network, etc.) and/or to another device, such as another computing device.

In one or more embodiments, the computing device (500) may include one or more output devices (508), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing data migration, the method comprising:
   receiving, by a target storage device and from a source storage device, a migration request for migration of application data, wherein the migration is associated with transmitting the application data from the source storage device to the target storage device, and wherein the source storage device issues the migration request based on an imminent failure of the source storage device;
   in response to the migration request:
   sending, by the target storage device, a security remote security script to the source storage device;
   obtaining, by the target storage device, a response based on execution of the security remote security script on the source storage device;
   performing, by the target storage device, a security classification on the source storage device based on the response to obtain a security tag for the source storage device;
   determining, by the target storage device, a migration strategy for the migration of the application data from the source storage device based on the security tag and based on a timeline of the imminent failure, wherein the migration strategy indicates a level of encryption and a level of compression for the migration, and wherein the level of encryption correlates inversely to a level of the security tag, and wherein the level of compression correlates inversely to the timeline of the imminent failure; and
   implementing the migration strategy to migrate the application data from the source storage device to the target storage device by applying the level of encryption and the level of compression to the application data prior to transmitting the data to the target storage device.

2. The method of claim 1, wherein the response comprises the security tag.

3. The method of claim 1, wherein the security remote security script is sent using an application programming interface (API) of the target storage device.

4. The method of claim 1, wherein determining the migration strategy is further based on a security status of the target storage device.

5. The method of claim 4, wherein the security tag specifies that the source storage device is a low security state.

6. The method of claim 4, wherein the security tag specifies that the source storage device is a high security state.

7. The method of claim 5, wherein the security status of the target device is high, and wherein the migration strategy specifies a high-encryption of the application data during the data migration and only a portion of the application data can be transferred.

8. The method of claim 6, wherein the security status of the target device is high, and wherein the migration strategy specifies a dynamic encryption of the application data during the data migration.

9. A non-transitory computer readable medium comprising computer readable program code, which when executed by a computer processor enables the computer processor to perform a method for managing data replication, the method comprising:
- receiving, by a target storage device and from a source storage device, a migration request for migration of application data, wherein the migration is associated with transmitting the application data from the a source storage device to the target storage device, and wherein the source storage device issues the migration request based on an imminent failure of the source storage device;
- in response to the migration request:
- sending, by the target storage device, a security remote security script to the source storage device;
- obtaining, by the target storage device, a response based on execution of the security remote security script on the source storage device;
- performing, by the target storage device, a security classification on the source storage device based on the response to obtain a security tag for the source storage device;
- determining, by the target storage device, a migration strategy for the migration of the application data from the source storage device based on the security tag and based on a timeline of the imminent failure, wherein the migration strategy indicates a level of encryption and a level of compression for the migration, and wherein the level of encryption correlates inversely to a level of the security tag, and wherein the level of compression correlates inversely to the timeline of the imminent failure; and
- implementing the migration strategy to migrate the application data from the source storage device to the target storage device by applying the level of encryption and the level of compression to the application data prior to transmitting the data to the target storage device.

10. The non-transitory computer readable medium of claim 9, wherein the response comprises the security tag.

11. The non-transitory computer readable medium of claim 9, wherein the security remote security script is sent using an application programming interface (API) of the target storage device.

12. The non-transitory computer readable medium of claim 9, wherein the security tag specifies that the source storage device is a low security state.

13. The non-transitory computer readable medium of claim 9, wherein the security tag specifies that the source storage device is a high security state.

14. The non-transitory computer readable medium of claim 12, wherein the migration strategy specifies a high-encryption of the application data during the data migration and only a portion of the application data can be transferred.

15. The non-transitory computer readable medium of claim 13, wherein the migration strategy specifies a dynamic encryption of the application data during the data migration.

16. A system for managing data replication, the system comprising:
- a processor comprising circuitry;
- memory comprising instructions, which when executed perform a method, the method comprising:
- receiving, by a target storage device and from a source storage device, a migration request for migration of application data, wherein the migration is associated with transmitting the application data from the a source storage device to the target storage device, and wherein the source storage device issues the migration request based on an imminent failure of the source storage device;
- in response to the migration request:
- sending, by the target storage device, a security remote security script to the source storage device;
- obtaining, by the target storage device, a response based on execution of the security remote security script on the source storage device;
- performing, by the target storage device, a security classification on the source storage device based on the response to obtain a security tag for the source storage device;
- determining, by the target storage device, a migration strategy for the migration of the application data from the source storage device based on the security tag and based on a timeline of the imminent failure, wherein the migration strategy indicates a level of encryption and a level of compression for the migration, and wherein the level of encryption correlates inversely to a level of the security tag, and wherein the level of compression correlates inversely to the timeline of the imminent failure; and
- implementing the migration strategy to migrate the application data from the source storage device to the target storage device by applying the level of encryption and the level of compression to the application data prior to transmitting the data to the target storage device.

17. The system medium of claim 16, wherein the security tag specifies that the source storage device is a low security state.

18. The system of claim 16, wherein the security tag specifies that the source storage device is a high security state.

19. The system of claim 17, wherein the migration strategy specifies a high-encryption of the application data during the data migration and only a portion of the application data can be transferred.

20. The system of claim 18, wherein the migration strategy specifies a dynamic encryption of the application data during the data migration.

* * * * *